May 19, 1942.    T. W. FIELDS ET AL    2,283,497
BORING BAR
Filed Oct. 6, 1941

INVENTORS.
THEODORE W. FIELDS.
HENRY N. OLIVER.
BY
ATTORNEY.

Patented May 19, 1942

2,283,497

UNITED STATES PATENT OFFICE 2,283,497

BORING BAR

Theodore W. Fields, Los Angeles, and Henry N. Oliver, South Gate, Calif.

Application October 6, 1941, Serial No. 413,790

9 Claims. (Cl. 77—58)

This invention relates to a boring bar which is used in the boring of tubular parts, such as cylinders, hydraulic cylinders, gun barrels and the like.

An object of our invention is to provide a novel boring bar which is provided with an effective means of supporting the bar while it is cutting the tubular member.

Another object of our invention is to provide a novel boring bar which includes a rotatable sleeve and has a yieldable supporting means on the rotatable member which engages the bore.

A feature of our invention resides in the novel means of lubricating the various parts of the boring bar.

Other objects, advantages and features of invention may appear from the accompanying drawing, the subjoined detailed description and the appended claims.

Figure 1:
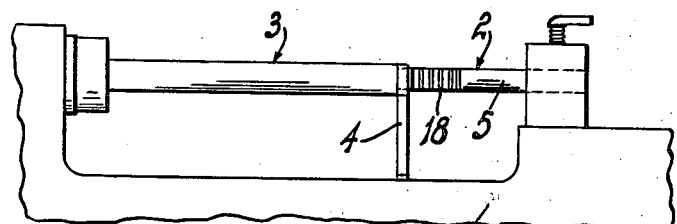
Figure 1 is a diagrammatical side elevation of our boring bar in operative position in a lathe.
Figure 2:
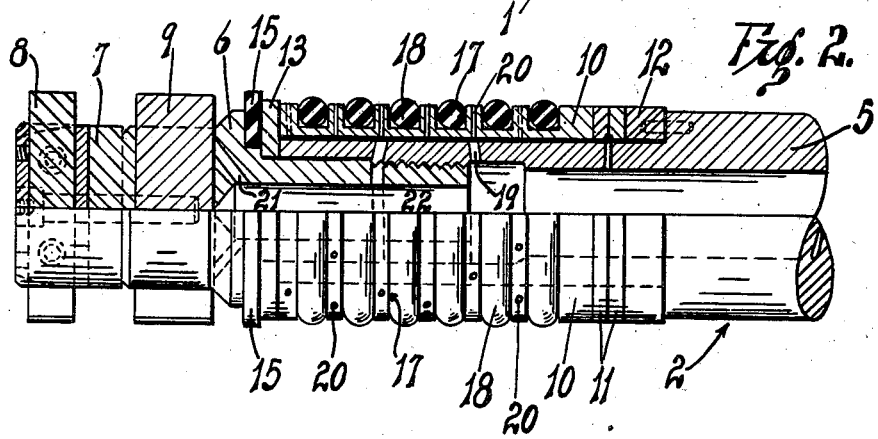
Figure 2 is a fragmentary quarter sectional view of the cutting portion of our boring bar.
Figure 3:
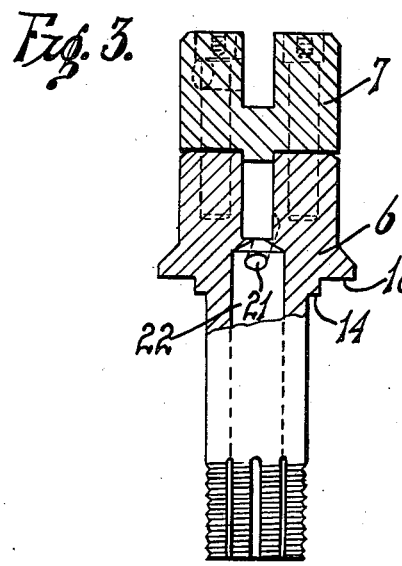
Figure 3 is a partial sectional view of the head of our boring bar.
Figure 4:
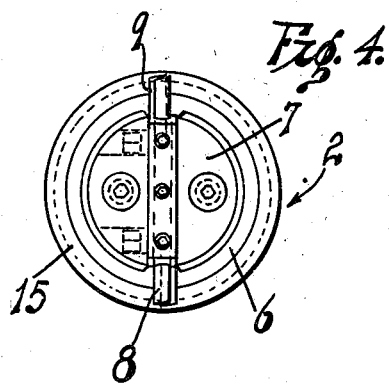
Figure 4 is an end view of our boring bar.

In usual practice, the boring bar is chucked in a lathe and is then moved into the tubular member which is to be bored, this member being suitably held in proper alignment with the boring bar. As diagrammatically shown in Figure 1, the lathe 1, of any desired type, grips the boring bar 2 and moves this boring bar into the tubular member 3, which is to be bored. In order that the boring bar may properly enter the member which is to be bored, we may provide a starting rest 4, which consists of a short tube and which is accurately aligned with the boring bar and with the member which is to be bored, thus properly guiding the boring bar as it starts its cutting operation.

The boring bar 2 comprises a tubular mandrel 5 of suitable length, the one end being suitably held or chucked in a machine tool, such as a lathe. A cutter head 6 is fixedly mounted on the outer end of the mandrel 5, preferably by threading the cutter head to the mandrel. A cutter block 7 is fixedly attached to the outer end of the cutter head 6 by suitable means, such as cap screws, or the like. A cutter 8 is mounted in the block 7 in the usual and well-known manner. A second cutter 9 is mounted in the head 6 and is held in position by the block 7, all of which is usual and well-known in the art.

At the outer end, the mandrel 5 is reduced in diameter to accommodate a sleeve 10, which is journaled on the mandrel and may rotate, relative to the mandrel when the boring bar is in use. A pair of thrust washers 11 are positioned at the rear end of the sleeve 10, and these thrust washers bear against a ring 12 which is pinned to the boring bar 5. A thrust washer 13 is provided at the forward end of the sleeve 10 and this thrust washer is held in position by the shoulder 14 on the head 6.

A wiper ring 15, formed of suitable flexible material, such as rubber or synthetic rubber, is held in position against the thrust ring 13 on the one side and a shoulder 16 on the other. The shoulder 16 is formed on the cutter head 6, substantially as shown. A plurality of angular grooves 17 are formed in the sleeve 10 and each of these grooves receives a packing ring 18 formed of rubber, synthetic rubber, or the like. The rings 18 will fit the bore which is being cut and a proper pressure is exerted by these rings against the bore, thus holding the boring bar in proper alignment and prevent chatter and also preventing the bar from moving out of proper alignment. The rings 18 are preferably circular in cross section and the grooves 17 are of sufficient depth so that these rings will be supported and thus will not be slipped out of their grooves under pressure and when the tool is in operation. The ring 15 will wipe the bore clear of any cuttings, thus preventing injury to the spacing and guide rings 18.

It has been found that when the tool is in operation the rings 18 will crawl circumferentially, thus preventing excessive wear. As previously stated, the rings 18 will be partially compressed as they enter the bore and, consequently, some wear of these rings will not interfere with the accuracy of the boring bar.

A circulating fluid is pumped through the tubular mandrel 5 and passes through ducts 19 in the mandrel to ports 20 in the sleeve 10, thus carrying the oiling fluid to the surface of the bore contacted by the rings 18. Bores 21 in the head 6 conduct this oiling fluid to the sides of the cutter 9, thus washing the cuttings forwardly and also cooling the cutter, all of which is the usual practice.

The head 6 is counter-bored, as shown at 22, in alignment with the bore of the mandrel 5, for the purpose of conducting this circulating fluid forwardly in the bar.

Having described our invention, we claim:

1. In a boring bar, a cutter mounted on one end of said bar, a sleeve rotatably mounted on the bar adjacent the cutter and resilient means on the sleeve, said resilient means projecting beyond the periphery of the sleeve, and a yieldable wiper ring on the bar forwardly of the sleeve.

2. In a boring bar, a cutter mounted on one end of said bar, a sleeve rotatably mounted on the bar adjacent the cutter and resilient means on the sleeve, said resilient means projecting beyond the periphery of the sleeve, said bar having a fluid passage extending therethrough, and fluid ducts extending through the wall of the bar to the sleeve, said sleeve having fluid ports extending through the wall thereof.

3. In a boring bar, a cutter mounted on one end of said bar, a sleeve rotatably mounted on the bar adjacent the cutter, said sleeve having annular grooves therein and a resilient ring in each of said grooves, said ring projecting beyond the periphery of the sleeve.

4. In a boring bar, a cutter mounted on one end of said bar, a sleeve rotatably mounted on the bar adjacent the cutter, said sleeve having annular grooves therein and a resilient ring in each of said grooves, said ring projecting beyond the periphery of the sleeve, and a yieldable wiper ring on the bar forwardly of the sleeve.

5. In a boring bar, a cutter mounted on one end of said bar, a sleeve rotatably mounted on the bar adjacent the cutter, said sleeve having annular grooves therein and a resilient ring in each of said grooves, said ring projecting beyond the periphery of the sleeve, said bar having a fluid passage extending therethrough and fluid ducts extending through the wall of the bar to the sleeve, said sleeve having fluid ports extending through the wall thereof.

6. A boring bar comprising a tubular mandrel, a head fixedly mounted on one end of the mandrel, a cutter in the head, a sleeve rotatably mounted on the mandrel adjacent the head, and resilient means projecting beyond the periphery of the sleeve, and a yieldable wiper ring on the mandrel forwardly of the sleeve.

7. A boring bar comprising a tubular mandrel, a head fixedly mounted on one end of the mandrel, a cutter in the head, a sleeve rotatably mounted on the mandrel adjacent the head, and resilient means projecting beyond the periphery of the sleeve, said mandrel having a fluid passage extending longitudinally thereof and fluid ducts extending through the wall of the mandrel to the sleeve, said sleeve having fluid ports extending through the wall thereof.

8. A boring bar comprising a tubular mandrel, a head fixedly mounted on one end of the mandrel, a cutter in the head, a sleeve rotatably mounted on the mandrel adjacent the head, said sleeve having annular grooves therein and a resilient ring in each of said grooves, said rings projecting beyond the periphery of the sleeve.

9. A boring bar comprising a tubular mandrel, a head fixedly mounted on one end of the mandrel, a cutter in the head, a sleeve rotatably mounted on the mandrel adjacent the head, said sleeve having annular grooves therein and a resilient ring in each of said grooves, said rings projecting beyond the periphery of the sleeve, and a yieldable wiper ring on the mandrel forwardly of the sleeve.

THEODORE W. FIELDS.
HENRY N. OLIVER.